(12) United States Patent
Roux

(10) Patent No.: US 6,490,808 B1
(45) Date of Patent: Dec. 10, 2002

(54) TOPOGRAPHIC MEASURING DEVICE

(76) Inventor: Daniel Roux, 80 Allee des Troenes, F-38340 Voreppe (FR)

( * ) Notice: Subject to any disclaimer, the term of this patent is extended or adjusted under 35 U.S.C. 154(b) by 0 days.

(21) Appl. No.: 09/720,685

(22) PCT Filed: May 5, 2000

(86) PCT No.: PCT/FR00/01226

§ 371 (c)(1), (2), (4) Date: Dec. 29, 2000

(87) PCT Pub. No.: WO00/68641

PCT Pub. Date: Nov. 16, 2000

(30) Foreign Application Priority Data

May 6, 1999 (FR) .............................................. 99 05950

(51) Int. Cl.$^7$ ................................................ G01B 5/00
(52) U.S. Cl. .......................................... 33/720; 33/392
(58) Field of Search ........................ 33/720, 366, 378, 33/392, 309, 354, 393, 402

(56) References Cited

U.S. PATENT DOCUMENTS

| | | | | |
|---|---|---|---|---|
| 3,983,636 A | * | 10/1976 | Fashbaugh et al. | 33/346 |
| 4,216,590 A | * | 8/1980 | Kelly | 33/304 |
| 4,422,243 A | * | 12/1983 | Brunson et al. | 33/366 |
| 4,430,804 A | * | 2/1984 | Nordgren et al. | 33/398 |
| 4,467,526 A | * | 8/1984 | Otte | 33/304 |
| 4,507,603 A | * | 3/1985 | Roach et al. | 33/392 |
| 4,947,692 A | | 8/1990 | Koppel | |
| 5,212,889 A | * | 5/1993 | Lysen | 33/286 |
| 5,225,626 A | * | 7/1993 | Bowers | 33/392 |
| 5,368,132 A | * | 11/1994 | Hollowell et al. | 187/393 |
| 5,512,905 A | * | 4/1996 | Nickols et al. | 342/357 |
| 6,286,992 B1 | * | 9/2001 | Kyrtsos | 374/45 |
| 6,425,186 B1 | * | 7/2002 | Oliver | 33/293 |

FOREIGN PATENT DOCUMENTS

| | | | | |
|---|---|---|---|---|
| DE | 3326618 A | * | 2/1984 | B66C/13/16 |
| DE | 03701516 A1 | * | 8/1988 | G01C/5/00 |
| DE | 3713006 A | * | 10/1988 | B66F/3/46 |
| FR | 2 477 701 | | 3/1980 | |
| FR | 2531053 A1 | * | 2/1984 | B66C/23/90 |
| WO | WO 90/10193 | | 9/1990 | |
| WO | WO90/11489 | * | 10/1990 | G01C/9/06 |

* cited by examiner

Primary Examiner—Diego Gutierrez
Assistant Examiner—Gail Verbitsky
(74) Attorney, Agent, or Firm—Oliff & Berridge, PLC

(57) ABSTRACT

The invention concerns a device for measuring the position of a lower positioning reference system with respect to an upper positioning reference system located above the former, comprising a pendulum including a pendulous mass and a metrological wire fixed on one side to the pendulous mass and on the other to the higher reference system, and a first proximity sensor capable of supplying a signal representing the position or the variation of position in the vertical direction of a planar zone of the surface of the pendulous mass relative to the lower reference system. Second and third proximity sensors, both optional supply each a signal representing the position or variation of position of a zone of the wire relative to the planar vertical surfaces of measurement related to the lower reference system and perpendicular to each other.

32 Claims, 2 Drawing Sheets

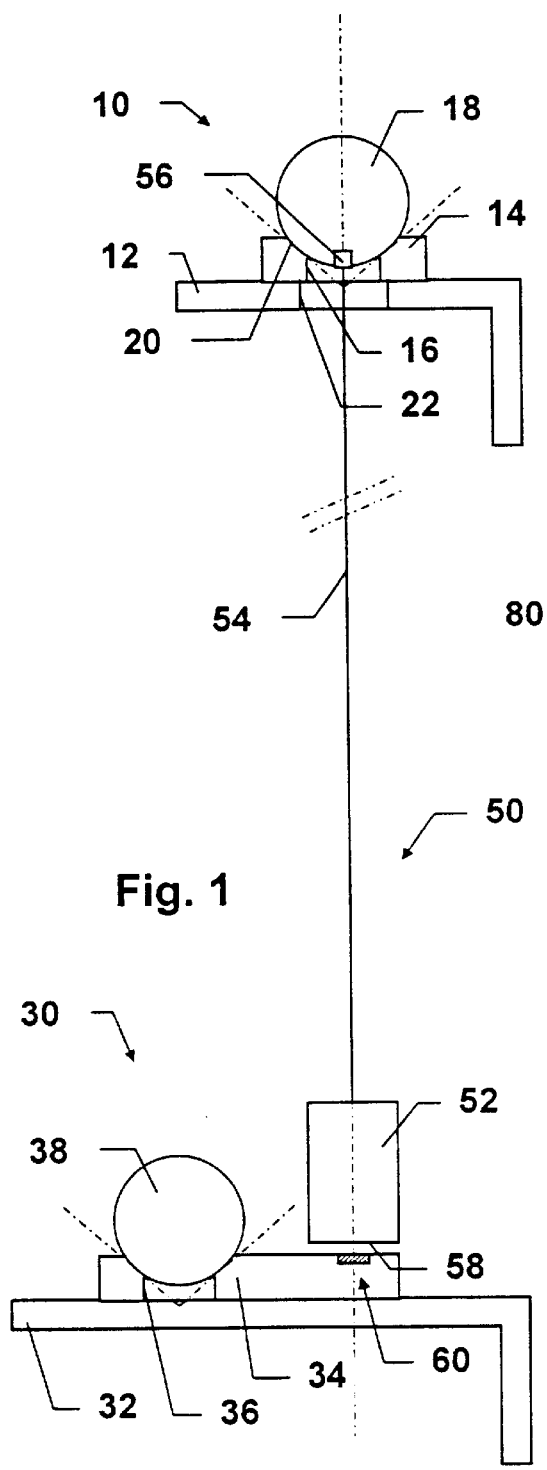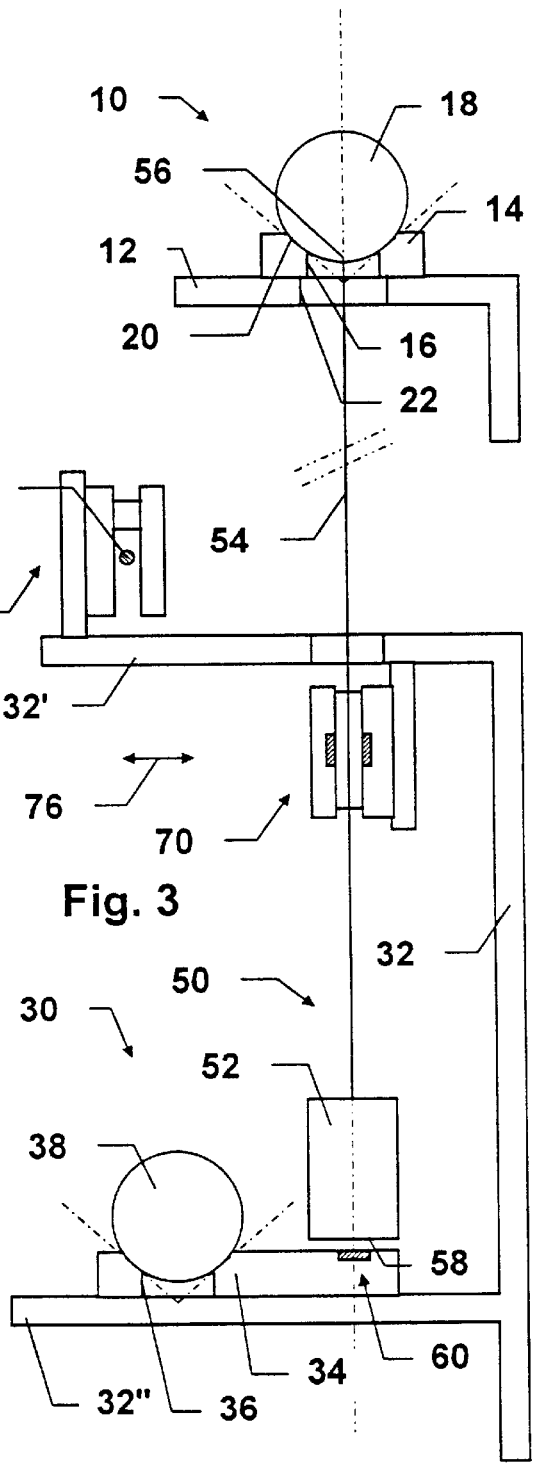

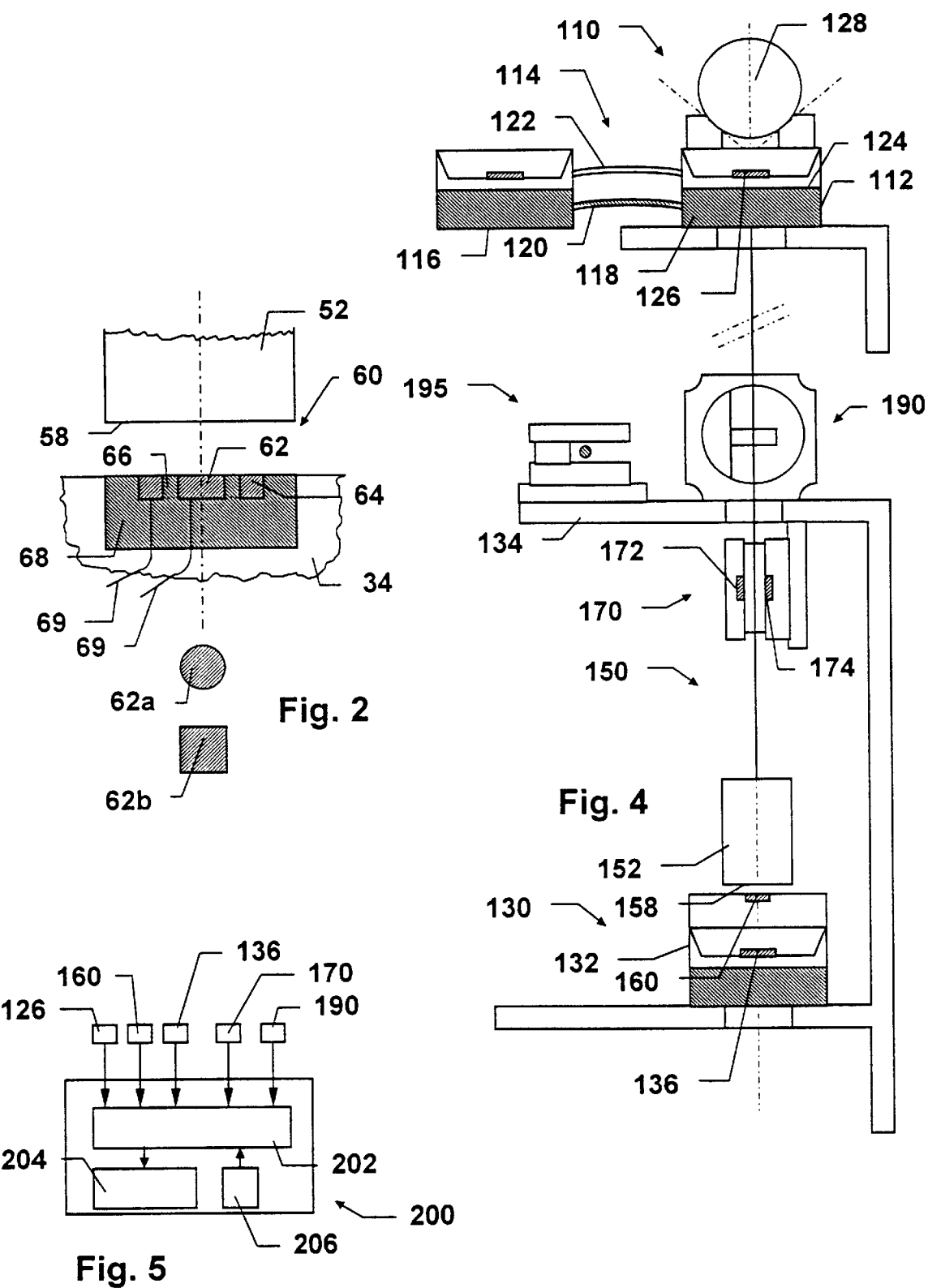

TOPOGRAPHIC MEASURING DEVICE

BACKGROUND OF THE INVENTION

The invention relates to a device for measuring variations of position between two positioning reference systems located at different heights.

STATE OF THE TECHNIQUE

Various types of reference systems, i.e. devices acting as reference for positioning elements in space, are known in the field of topographic measurement. Certain reference systems are three-dimensional, others are one- or two-dimensional.

A conventional standard three-dimensional reference system in the field of topographic measurement is formed by a metrological sphere of calibrated diameter, known under the name of Taylor or Hobson sphere, acting as an optic sight.

When we are only interested in levelling of elements in space, i.e. when all that is required is to measure or monitor the relative altitude of each element with respect to the reference system, the latter can advantageously implement hydrostatic means. An example of such a device is disclosed in the document FR 2,656,418. The device comprises closed pots placed respectively at each of the points to be measured. These pots are partly filled with a liquid and are connected by liquid conducting tubes opening out at the bottom so as to form a liquid circuit, and by gas conducting tubes. Each pot is equipped with a capacitive proximity sensor placed above and at a distance from the upper surface of the liquid it contains and designed to supply a position signal in the vertical direction of an area of this upper surface of the liquid in this pot. The device comprises in addition means for comparing the signals supplied by the sensors so as to be able to provide information on the relative position of the pots, and consequently of the points, with respect to one another or with respect to a vertical reference position. Each of the pots of such a device constitutes a levelling reference system in so far as the altitude (absolute measurement) or difference in level (relative measurement) of its base with respect to that of a reference pot is accessible.

The foregoing devices do not however cover all the requirements of precise measurement and monitoring of the level differences or level difference variations between points situated at large distances from one another. Certain large civil engineering structures do in fact require levelling reference systems to be set up situated at different heights. Such is the case for example in dams, mine shafts or underground particle accelerators. Two levelling reference systems situated at different altitudes, at a distance of several meters, then have to be able to be joined to one another to be able to establish the relative variations of their co-ordinates. This connection must be made without adverse implications on existing levelling reference systems and therefore has to be able to be adapted to the latter.

SUMMARY OF THE INVENTION

The object of the present invention is to provide a solution to this problem by means of a device for measuring the variation of position of a lower positioning reference system with respect to an upper positioning reference system located above the former, and comprising:
  a pendulum comprising
    a pendulous weight and
    a metrological wire fixed on one side to the pendulous weight and on the other side to the upper reference system, and
  a first proximity sensor designed to supply a signal representative of the position or the variation of position in the vertical direction of a flat area of the surface of the pendulous weight with respect to the lower reference system.

In this form, the invention finds a direct application in measurement of mining subsidence. The positioning reference systems may be of any type. Naturally the invention is used to full advantage when the reference systems are at least levelling reference systems, i.e. when they can act as reference for relative altimetric measurements. In practice, the flat area of the surface is preferably rectified and arranged perpendicularly to the wire.

The device preferably comprises in addition a second proximity sensor designed to supply a signal representative of the position or the variation of the position of an area of the wire with respect to a first flat vertical measuring surface securedly affixed to the lower reference system. The device then enables the horizontal movements of the lower reference system in the axis perpendicular to the vertical measuring plane to be monitored. Typically, such a device can be used to perform monitoring of the thrust of the arch of a dam.

According to one embodiment of the invention, the device comprises in addition a third proximity sensor designed to supply a signal representative of the position or the variation of position of an area of the wire with respect to a second flat vertical measuring surface securedly affixed to the lower reference system and perpendicular to the first flat vertical measuring surface, the device then enables the variations of three-dimensional co-ordinates of the lower reference system with respect to the upper reference system to be accessed. It enables the verticality between the two reference systems to be checked.

A metrological wire is a wire with a low thermal expansion coefficient in the measurement field. Ideally this wire must also have a high longitudinal stiffness so as to only undergo a very small elongation when it supports the pendulous weight. Invar constitutes an alloy combining the mechanical properties sought for. Alternatively, the wire can be made of piano wire or any other material with a mechanical strength, geometry and resistivity equivalent to invar. Another alternative is a carbon fibre wire. However the elongation of the wire, which is greater than for invar, and its variations according to the temperature and humidity, then have to be taken into consideration. In practice, the latter solution will be able to be implemented in dry environments with a stable temperature. The pendulous weight must also be chosen to suit the wire used so as to only generate a very slight elongation while keeping the wire taut.

Preferably at least one of the proximity sensors is a capacitive sensor, sensors of this type having proved their qualities of precision, ease of implementation and reliability over long periods, so that they prove particularly well suited for the type of applications envisaged in surveillance of civil engineering structures. Various types of capacitive measurements can be implemented. If the metrological wire used is electrically conducting, a short current impulse can for example be sent on the wire with a time constant of about one nanosecond. This impulse induces electrostatic charges between two metal plates by influence. Measurement of the charge difference provides quantitative information on the deviation of the wire with respect to the mid-plane between the two plates. If the wire is constituted by a material with a high electrical resistivity, for example carbon fibres, the second and third proximity sensors are then advantageously formed by distance meters of the type described in greater detail in the document FR 2,741,147. Naturally, other proximity measuring principles can be adopted by the metrology specialist.

Preferably, the device further comprises means for processing the signals supplied by the proximity sensor or sensors, comprising means for sampling at a given frequency and computing means enabling an average of the signal taken over a given number of samples to be calculated. The sampling frequency is chosen so as to dampen out the variations due to the residual pendulum phenomenon and therefore is chosen at a value greater than twice the frequency proper of the pendulum. Should the variations due to the longitudinal vibrations of the pendulous weight induced by the stiffness of the wire also require to be dampened out, it may be useful to select a frequency twice the longitudinal frequency proper of the spring weight system formed by the pendulous weight and the wire. However, this variation proves in practice to be insignificant provided that care has been taken to choose a wire of sufficient stiffness. The device enables continuous monitoring by calculation of a moving average. Alternatively, the processing means comprise a software storing the successive low points and high points of oscillation of the pendulum in memory and then computing an average from these points over a time interval greater than the pendulum period. The value obtained is retained if the standard deviation of the set of samples is lower than a preset threshold value above which it is considered that the pendulum is disturbed.

According to one embodiment, the upper reference system and/or lower reference system comprise a metrological sphere centred on a chamfered metrological bore and/or a measuring pot designed to be integrated in an altimetric measuring network by hydrostatic means and/or an electronic GPS reference system and/or an altimetric reference system with a taut horizontal wire.

The different levelling reference systems envisaged are not necessarily redundant in so far as they are each designed to enable levellings with different means and connections to different networks with different precisions. In practice, it is in fact rare for a structure to be equipped with a totally unified measurement system. It is therefore useful to leave some scope in the choice of levelling method.

According to one embodiment, the upper reference system and/or lower reference system are securedly affixed to a connection unit for connection to a taut-wire axial alignment measurement network. The document FR 2,741,147 describes an example of a device of this type comprising a resistive wire stretched along a longitudinal reference axis, arranged near to elements to be aligned and dynamically earthed. A measuring electrode equipped with a guard electrode and arranged in the measurement plane situated close to the taut wire is excited by an AC signal. A capacitive measuring bridge delivers a measurement signal representative of the position of the electrode with respect to the wire in a direction perpendicular to the measurement plane.

According to one embodiment, the upper reference system and/or lower reference system are securedly affixed to a connection unit to an absolute or relative distance measurement network. The connection unit can then be formed by a support bore of a metrological sphere. The absolute measurement can be obtained by measurement with the "distinvar" type distance meter developed by the CERN. Alternatively, absolute or relative distance measurements can be obtained by means of an interferometer.

The device therefore presents a great modularity.

BRIEF DESCRIPTION OF THE DRAWINGS

Other advantages and features of the invention will become more clearly apparent from the following description of different embodiments of the invention given as non-restrictive examples only and represented in the accompanying drawings in which:

FIG. 1 represents a first embodiment of the invention;

FIG. 2 represents a detail of a proximity sensor used in the first embodiment of the invention;

FIG. 3 represents a second embodiment of the invention;

FIG. 4 represents a third embodiment of the invention;

FIG. 5 represents a processing unit.

DESCRIPTION OF PREFERRED EMBODIMENTS

With reference to FIG. 1, a first levelling reference system 10 comprises a support 12 in the form of a bracket, a base 14 comprising a chamfered metrological bore 16 on which a standard metrological optic sphere 18 called a Taylor & Hobson sphere rests. The sphere 18 has a diameter of 88.90 mm adjusted to within 1/100 mm. The bore 16 has a diameter of 30 mm adjusted to within 1/100 mm. The chamfer 20 opens at an angle of 120° in the upper part of the bore 16 and performs the contact with the sphere 18.

The bracket 12 also has a bore 22 concentric with that of the base 14.

A second reference system 30 situated at a lower altitude than the first, in practice at a distance of 1 to 10 meters, also comprises a support 32 in the form of a bracket, a base 34 comprising a chamfered metrological bore 36 on which a standard metrological sphere identical to that of the upper reference system 10 rests.

There is fixed to the sphere 18 of the upper reference system a pendulum 50 comprising a cylindrical pendulous weight 52 of 9 kg suspended on the end of an invar wire 54 with a diameter of 1.65 mm, these figures being given for indication purposes only. The wire 54 is fixed at its top end in a bore 56 of the sphere 18. The bottom face 58 of the cylinder constituting the pendulous weight 52 is mirror-polished.

A proximity sensor 60 is fixed to the base 34 of the lower reference system facing the polished bottom surface 58 of the pendulous weight 52. The sensor 60, represented schematically in FIG. 2, is a standard capacitive sensor of the type described in the document FR 2,656,418, and comprises a central electrode 62 with a cylindrical cross-section (62a) or preferably a square or rectangular cross-section (62b), an annular guard electrode 64 coaxial with the central electrode 62, an annular electrical insulator 66 filling the space separating the central electrode from the annular guard electrode and an external electrical insulator 68 separating the active parts of the sensor from the base. The central electrode 62 and the annular electrode 64 are preferably made of a Fe—Ni alloy with 42% Ni and the electrical insulators are preferably made of glass. In the embodiment given as an example, the two insulators 66 and 68 are in a single part. Electrical wires 69 each connect electrodes 62, 64 to a measuring circuit. The assembly may be equipped with a temperature compensation circuit. The sensor 60 is in addition equipped with a heating and protection against humidity and corrosion device, as described in the Patent FR 2,656,418. Mechanical protection is achieved by affixing a plate of heat conducting glass.

The device is implemented as follows: an initial absolute measurement can be obtained by traditional topography instruments. The continuous relative measurement is given by the sensor signal, after sampling in time at a frequency of 100 Hz and computation of a sliding average over 10 s.

With reference to FIG. 3, a second embodiment comprises the two reference systems, upper 10 and lower 30, of the first embodiment, joined by a pendulum 50 with an electrically earthed invar wire 54. For the sake of simplification, elements identical or similar to corresponding elements of the first embodiment bear the same reference numbers and the first embodiment should be referred to for description thereof. The support 32 of the second reference system 30 comprises an upper platform 32' and a lower platform 32". It should be emphasised that the upper platform 32', contrary to what the very schematic figure might suggest, is in fact much closer to the lower platform 32" than to the support of the upper reference system 10, the length of the wire 54 of the pendulum being measured in meters. The upper platform supports a capacitive proximity sensor 70, for example of the type described in the patent application FR 2,741,147 for measuring the axial deviations of an alignment system with a taut wire or preferably of the type described in the document FR 2,656,418, but with a rectangular or square cross-section, as described previously. The wire 54 of the pendulum passes between the electrodes 72, 74 of the sensor 70, which delivers a signal representative of the deviation of the wire 54 with respect to a middle positions ituated at mid-distance from the electrodes 72, 74, and therefore of the variation of the distance between the wire 54 and the vertical flat surface perpendicular to the plane of the figure, in which the electrode 74 is flush.

This device therefore not only enables the difference of altitude between the two reference systems 10 and 30 or the variation of the difference of altitude between these reference systems to be measured, as in the previous embodiment, but also enables measurement of the variations of positioning of the lower reference system 30 with respect to the upper reference system in the direction of the axis 76 symbolised in FIG. 3.

The upper platform 32' comprises in addition another proximity sensor 80 designed for connecting the lower reference system 30 to an axial alignment system with a horizontal taut wire 82 made of carbon fibres of the type described in the document FR 2,741,147.

The device therefore enables the variations of positioning of the wire 82 of this alignment installation with respect to the upper reference system 10 to be known indirectly.

It is clear that it could also be envisaged to connect the upper reference system 10, under the same conditions, to an alignment system with a taut wire made of carbon fibres at the upper level, by adding a sensor identical to the sensor 80.

If a universal capacitive sensor is required to be used for all the functions described, it becomes important to study the shape of the sensor electrodes. A disk-shape, of the type of the sensor 62a of FIG. 2, is naturally best suited for measuring the deviations of the sensor 158, whereas measurements of the movements on a taut wire 80 require a rectangular sensor. A satisfactory compromise is found with the square electrode shape 62b. This shape of electrode will be implemented for each of the sensors in so far as it proves compatible with the required measuring precision.

With reference to FIG. 4, a levelling reference system 110 comprises a pot 112 forming part of a levelling installation 114 of the type described in the document FR 2,656,418 and comprising other identical pots 112'. Each pot 112, 112' is partly filled with a liquid 118 and connected by liquid conducting tubes 120 to the other pots so as to form a liquid circuit.

Likewise, the upper parts of the different pots communicate with one another by means of gas conducting tubes 122.

The circuit is completed by a liquid and gas tank of large dimensions, not represented, and by a device for communication of the liquid and gas between the pots and the tank. By the communicating vessel effect, the free surface 124 of the liquid approximately follows the local geoid and provides a base reference system, practically constant at constant temperature, due to the large volume of the tank.

A capacitive proximity sensor 126 situated in the upper part of each pot 112, 116 measures the variation of the height of the liquid in each pot, and therefore the variation of the height of the pot with respect to the water level. The pot 112 therefore constitutes a secondary levelling reference system. In practice, the measurement is corrected by a thermometric measurement. Reference should be made to the document FR 2,656,418 for the details of implementation of this installation. A metrological sphere 128 of the previously described type is located on top of the pot 112 so as to enable transmission of the reference system to be performed by optic measurement if necessary.

The device also comprises a lower levelling reference system 130 comprising a pot 132 inserted in a levelling installation of the same type as the upper installation, but not represented in the figure. A proximity sensor 136 delivers a signal representative of the height of the surface of the liquid in the pot 132. The lower reference system 130 comprises an upper platform 134 supporting two proximity sensors 170, 180 identical in their positioning and function to the sensors 70 and 80 of the second embodiment, and a proximity sensor 190 similar to the previous ones, but rotated through 90°.

The two reference systems are joined by a pendulum 150 identical to that of the first embodiment of the invention comprising a weight 152 suspended on the end of a wire 154. The wire 154 is placed between the electrodes of the sensors 170 and 190. The sensor 190 measures the position of the wire 154 along an axis perpendicular to the plane of the figure, i.e. the distance between the wire and a plane parallel to the plane of the figure.

The device is completed by a proximity sensor 160 identical to the sensor 60 of the first embodiment. The three proximity sensors 160, 170, 190 enable access to be had to the three-dimensional movements of the lower reference system 130 with respect to the upper reference system 110.

The lower reference system 130 is completed by a proximity sensor 195 forming part of a taut-wire altimetric installation. In this installation, the relative vertical height variation between the taut wire and the sensor is measured, which assumes that the wire is practically straight and horizontal. Naturally, the wire tends to take a sagging form. This sag is flattened out by choosing a wire of very low weight stretched tight by a wire-stretching device known to the man of the trade and described for example in the document FR 2,741,417 already referred to.

With reference to FIG. 5, the signals supplied by the sensors are processed by a processing unit 200 comprising sampling means 202 for sampling at a given frequency, and computing means 204 enabling an average of the signal taken over a given number of samples to be calculated. The unit also comprises means 206 for adjusting the sampling frequency. The sampling frequency is in practice chosen so as to be greater than ten times the frequency of the pendulum. The number of samples taken for calculating the sliding average is such that the time window corresponding to the average is greater than ten times the pendulum period.

Numerous variations are naturally possible without departing from the scope of the invention. The embodiments show that the pendulum can be used with various types of levelling reference systems: three-dimensional optic reference system such as the metrological sphere, hydrostatic altimetric reference system or taut-wire levelling reference system, for example. It is also possible to envisage an electronic reference system by adding an antenna for connection to a GPS for either one or both of the upper or lower stations. Taut-wire reference systems can be used to complete the upper reference system and/or the lower reference system. It is also possible to combine several of the foregoing means for each station, the advantage being that each of the types of reference system enables co-ordinates to be transferred to a different type of external network or installation. These reference systems may or may not be completed by installations for alignment along one or more horizontal axes.

What is claimed is:

1. A measuring device for measuring a variation in a position of a lower positioning reference system with respect to an upper positioning reference system located above the lower positioning reference system, said device comprising:
    a pendulum comprising a pendulous weight and a metrological wire fixed on one side to the pendulous weight and on the other side to the upper reference system;
    a first proximity sensor designed to supply a signal representative of a position or the variation of position in the vertical direction of a flat area of the surface of the pendulous weight with respect to the lower reference system;
    a second proximity sensor designed to supply a signal representative of a position or the variation of position of an area of the wire with respect to a first flat vertical measuring surface securedly affixed to the lower reference system;
    a third proximity sensor designed to supply a signal representative of a position or the variation of position of an area of the wire with respect to a second flat vertical measuring surface securedly affixed to the lower reference system and perpendicular to the first flat vertical measuring surface, wherein at least one of said upper reference system and lower reference system comprises a metrological sphere or a measuring pot designed to be integrated in an altimetric measuring network by hydrostatic means.

2. The measuring device according to claim 1, wherein said metrological sphere is centered on a chamfered metrological bore.

3. The measuring device according to claim 1, herein at least one of the proximity sensors is a capacitive sensor.

4. The measuring device according to claim 3, herein said capacitive sensor comprises a central electrode having a square surface.

5. The measuring device according to claim 1, comprising:
    processing means for processing the signals supplied by the proximity sensor or sensors, the processing means including means for sampling at a given frequency and computing means enabling a quantity representative of the position of the pendulous weight with respect to the lower reference system to be calculated.

6. The measuring device according to claim 1, wherein at least one of said upper reference system and lower reference system is securedly affixed to a connection unit for connection to a taut-wire axial alignment measurement network.

7. The measuring device according to claim 1, wherein at least one of said upper reference system or lower reference system is securedly affixed to a connection unit for connection to an absolute or relative distance measurement network.

8. An altitude measuring process implementing a device according to claim 1, wherein:
    an index representative of an average of the signal delivered by the first proximity sensor over a given time interval is measured or computed;
    an index representative of a standard deviation of the signal delivered by the first proximity sensor and representative of the position or variation of the position in the vertical direction of a flat area of the surface of the pendulous weight with respect to the lower reference system over said time interval is measured or computed; and
    the index representative of the average is retained if the standard deviation is lower than a fixed threshold, otherwise this index is rejected.

9. A measuring device for measuring a variation in a position of a lower positioning reference system with respect to an upper positioning reference system located above the lower positioning reference system, said device comprising:
    a pendulum comprising a pendulous weight and a metrological wire fixed on one side to the pendulous weight and on the other side to the upper reference system, and
    a first proximity sensor designed to supply a signal representative of a position or the variation of position in the vertical direction of a flat area of the surface of the pendulous weight with respect to the lower reference system;
    a second proximity sensor designed to supply a signal representative of a position or the variation of position of an area of the wire with respect to a first flat vertical measuring surface securedly affixed to the lower reference system;
    a third proximity sensor designed to supply a signal representative of a position or the variation of position of an area of the wire with respect to a second flat vertical measuring surface securedly affixed to the lower reference system and perpendicular to the first flat vertical measuring surface, wherein at least one of said upper reference system and lower reference system comprises a metrological sphere or a measuring pot designed to be integrated in an electronic GPS reference system.

10. The measuring device according to claim 9, wherein said metrological sphere is centered on a chamfered metrological bore.

11. The measuring device according to claim 9, wherein at least one of the proximity sensors is a capacitive sensor.

12. The measuring device according to claim 11, wherein said capacitive sensor comprises a central electrode having a square surface.

13. The measuring device according to claim 9, comprising:
    processing means for processing the signals supplied by the proximity sensor or sensors, the processing means including means for sampling at a given frequency and computing means enabling a quantity representative of the position of the pendulous weight with respect to the lower reference system to be calculated.

14. The measuring device according to claim 9, at least one of said upper reference system and lower reference system is securedly affixed to a connection unit for connection to a taut-wire axial alignment measurement network.

15. The measuring device according to claim 9, wherein at least one of said upper reference system or lower reference system is securely affixed to a connection unit for connection to an absolute or relative distance measurement network.

16. An altitude measuring process implementing a device according to claim 9, wherein:
- an index representative of an average of the signal delivered by the first proximity sensor over a given time interval is measured or computed;
- an index representative of a standard deviation of the signal delivered by the first proximity sensor and representative of the position or variation of the position in the vertical direction of a flat area of the surface of the pendulous weight with respect to the lower reference system over said time interval is measured or computed; and
- the index representative of the average is retained if the standard deviation is lower than a fixed threshold, otherwise this index is rejected.

17. A measuring device for measuring a variation in a position of a lower positioning reference system with respect to an upper positioning reference system located above the lower positioning reference system, said device comprising:
- a pendulum comprising a pendulous weight and a metrological wire fixed on one side to the pendulous weight and on the other side to the upper reference system, and
- a first proximity sensor designed to supply a signal representative of the position or the variation of position in the vertical direction of a flat area of the surface of a pendulous weight with respect to the lower reference system;
- a second proximity sensor designed to supply a signal representative of a position or the variation of position of an area of the wire with respect to a first flat vertical measuring surface securely affixed to the lower reference system;
- a third proximity sensor designed to supply a signal representative of a position or the variation of position of an area of the wire with respect to a second flat vertical measuring surface securely affixed to the lower reference system and perpendicular to the first flat vertical measuring surface, wherein at least one of said upper reference system and lower reference system comprises a metrological sphere or a measuring pot designed to be integrated in an altimetric reference system with a taut horizontal wire.

18. The measuring device according to claim 17, wherein said metrological sphere is centered on a chamfered metrological bore.

19. The measuring device according to claim 17, at least one of the proximity sensors is a capacitive sensor.

20. The measuring device according to claim 19 wherein said capacitive sensor comprises a central electrode having a square surface.

21. The measuring device according to claim 17, comprising processing means for processing the signals supplied by the proximity sensor or sensors, the processing means including means for sampling at a given frequency and computing means enabling a quantity representative of the position of the pendulous weight with respect to the lower reference system to be calculated.

22. The measuring device according to claim 17, wherein at least one of said upper reference system and lower reference system is securely affixed to a connection unit for connection to a taut-wire axial alignment measurement network.

23. The measuring device according to claim 17, wherein at least one of said upper reference system or lower reference system is securely affixed to a connection unit for connection to an absolute or relative distance measurement network.

24. An altitude measuring process implementing a device according to claim 17, wherein:
- an index representative of an average of the signal delivered by the first proximity sensor over a given time interval is measured or computed;
- an index representative of a standard deviation of the signal delivered by the first proximity sensor and representative of the position or variation of the position in the vertical direction of a flat area of the surface of the pendulous weight with respect to the lower reference system over said time interval is measured or computed; and
- the index representative of the average is retained if the standard deviation is lower than a fixed threshold, otherwise this index is rejected.

25. A measuring device for measuring a variation in a position of a lower positioning reference system with respect to an upper positioning reference system located above the lower positioning reference system, said device comprising:
- a pendulum comprising a pendulous weight and a metrological wire fixed on one side to the pendulous weight and on the other side to the upper reference system, and
- a first proximity sensor designed to supply a signal representative of a position or the variation of position in the vertical direction of a flat area of the surface of the pendulous weight with respect to the lower reference system;
- a second proximity sensor designed to supply a signal representative of a position or the variation of position of an area of the wire with respect to a first flat vertical measuring surface securely affixed to the lower reference system;
- a third proximity sensor designed to supply a signal representative of a position or the variation of position of an area of the wire with respect to a second flat vertical measuring surface securely affixed to the lower reference system and perpendicular to the first flat vertical measuring surface, wherein at least one of said upper reference system and lower reference system comprises a metrological sphere or a measuring pot designed to be integrated in an altimetric reference system with a taut vertical wire.

26. The measuring device according to claim 25, wherein said metrological sphere is centered on a chamfered metrological bore.

27. The measuring device according to claim 25, wherein at least one of the proximity sensors is a capacitive sensor.

28. The measuring device according to claim 27, wherein said capacitive sensor comprises a central electrode having a square surface.

29. The measuring device according to claim 25, comprising:
- processing means for processing the signals supplied by the proximity sensor or sensors, the processing means including means for sampling at a given frequency and computing means enabling a quantity representative of the position of the pendulous weight with respect to the lower reference system to be calculated.

30. The measuring device according to claim 25, wherein at least one of said upper reference system and lower reference system is securely affixed to a connection unit for connection to a taut-wire axial alignment measurement network.

31. The measuring device according to claim 25, wherein at least one of said upper reference system or lower reference system is securely affixed to a connection unit for connection to an absolute or relative distance measurement network.

32. An altitude measuring process implementing a device according to claim 25, wherein:

an index representative of an average of the signal delivered by the first proximity sensor over a given time interval is measured or computed;

an index representative of a standard deviation of the signal delivered by the first proximity sensor and representative of the position or variation of the position in the vertical direction of a flat area of the surface of the pendulous weight with respect to the lower reference system over said time interval is measured or computed; and the index representative of the average is retained if the standard deviation is lower than a fixed threshold, otherwise this index is rejected.

* * * * *